No. 721,800. PATENTED MAR. 3, 1903.
J. A. HEATLY.
HEIGHT MEASURING DEVICE.
APPLICATION FILED JULY 14, 1902.
NO MODEL.
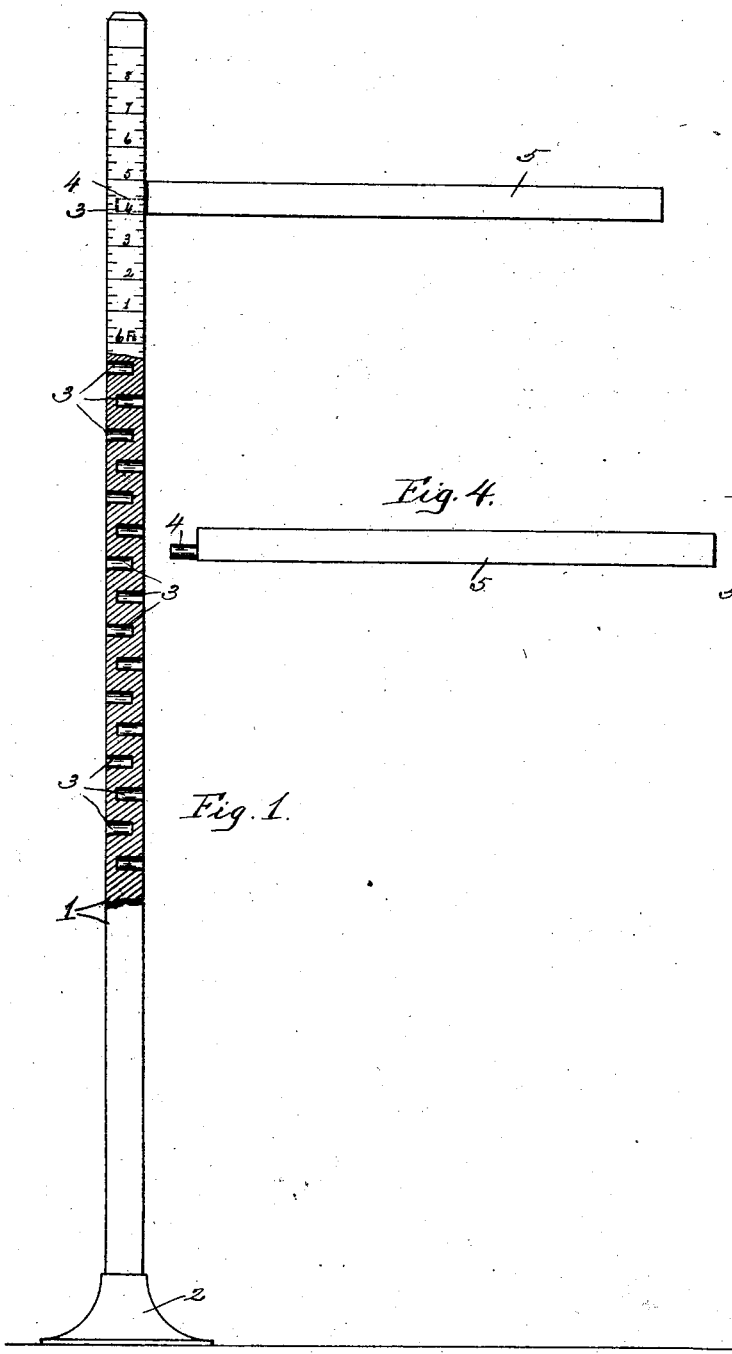
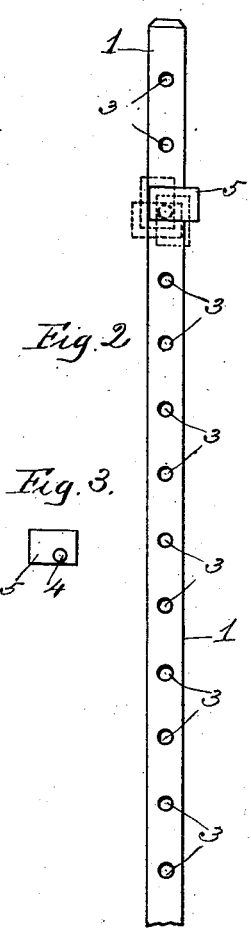
Witnesses:
E. M. O'Reilly
G. H. Morrison
Inventor:
John A. Heatly
By Mosher & Curtis
attys

UNITED STATES PATENT OFFICE.

JOHN A. HEATLY, OF SCHENECTADY, NEW YORK.

HEIGHT-MEASURING DEVICE.

SPECIFICATION forming part of Letters Patent No. 721,800, dated March 3, 1903.

Application filed July 14, 1902. Serial No. 115,410. (No model.)

*To all whom it may concern:*

Be it known that I, JOHN A. HEATLY, a citizen of the United States, residing at Schenectady, county of Schenectady, and State of New York, have invented certain new and useful Improvements in Height-Measuring Devices, of which the following is a specification.

The invention relates to such improvements; and it consists of the novel construction and combination of parts hereinafter described and subsequently claimed.

Reference may be had to the accompanying drawings and the reference characters marked thereon, which form a part of this specification.

Similar characters refer to similar parts in the several figures.

Figure 1 of the drawings is a view in side elevation of my improved height-measuring device, part being in section. Fig. 2 is a view in front elevation of the same, different positions of the index-arm being indicated by dotted lines. Fig. 3 is an end view of the tenoned end of the index-arm.

The object of my invention is to provide a cheap and simple apparatus for quickly ascertaining with approximate accuracy the height of a person or object.

Referring to the drawings, 1 represents an upright or standard erected from a supporting foot-plate or base 2 and provided at definite intervals in one or more of its sides or faces with circular apertures 3, each adapted to receive the circular tenon 4 on one end of the index-arm 5 and permit rotation of said tenon therein. The index-arm is preferably polygonal in form, and the tenon projects eccentrically therefrom in such a manner that each side of the arm is located at a distance from the tenon differing from that of the other sides. It will thus be seen that when the tenon is inserted in one of the standard-apertures 3 a movement of rotation imparted to the arm will cause its several sides as the same are successively moved to the under side to occupy horizontal planes at different distances below the tenon and the aperture in which the same is supported.

As shown in the drawings, the proportion and arrangement of the parts are such that each quarter-rotation of the index-arm causes a variation in the height of its under surface equal to a quarter of a unit of measurement.

The standard may be provided with a numbered scale arranged with reference to the apertures 3 and indicating in inches or feet and inches the height above the floor of the under surface of the index-arm in an extreme position of rotative adjustment, enabling the user at a glance to correctly read the height indicated by reference thereto and to the position of rotative adjustment of the index-arm. It will thus be seen that without removing the arm from its position in connection with the aperture 3 the under surface of the arm can be used as an index for four different heights, one of which is represented by a unit of measurement and the others by aliquot parts of a unit differing by quarter-inches. The apertures 3 are preferably so arranged that when the index-arm is applied to the standard in connection with one of said apertures the side of the arm nearest the tenon will when lowermost indicate a definite distance in inches from the floor. Then as the arm is rotated to bring its several other sides successively lowermost each will in turn indicate a definite distance from the floor in inches and quarter-inches.

In using the device the person or object to be measured occupies an erect position, resting upon the floor in front of the standard, and the index-arm is inserted in that one of the apertures 3 which is next above the object or person in height and is then rotated until one of its sides, by engagement with the object or person or by close proximity thereto, indicates the height with sufficient accuracy.

If desired, the apertures 3 may be formed in alternation in opposite sides of the standard, as shown.

When desired, the base 2 of the standard may be omitted and the standard supported in any other known manner in definite relation to the floor of the room.

What I claim as new, and desire to secure by Letters Patent, is—

1. In a height-measuring device the combination with a standard having definitely-spaced circular apertures; of a polygonal index-arm having an eccentric tenon adapted to fit the several apertures in the standard, said arm being adapted by rotation to indicate by its several sides, when lowermost, different heights.

2. In a height-measuring device the combination with a standard having definitely-spaced circular apertures and provided with a scale numbered in accordance with units of measurement; of a polygonal index-arm having an eccentric tenon adapted to fit the several apertures in the standard; one side of said arm being adapted when lowermost to indicate the number of units of height measurement corresponding with the position of the standard-aperture in connection with which the arm is supported and the other sides adapted when lowermost to indicate height measurements differing therefrom by aliquot parts of a unit of measurement, substantially as described.

In testimony whereof I have hereunto set my hand this 9th day of July, 1902.

JOHN A. HEATLY.

Witnesses:
   J. WARD SCHERMERHORN,
   MARY K. SEELEY.